United States Patent
Toikka (10) Patent No.: US 9,231,771 B2
(45) Date of Patent: Jan. 5, 2016

(54) METHOD AND ARRANGEMENT FOR GATHERING DATA FROM A COMMUNICATION NETWORK

(75) Inventor: Toni Jaakkima Toikka, Helsinki (FI)

(73) Assignee: ALEKSTRA OY, Helsinki (FI)

( * ) Notice: Subject to any disclaimer, the term of this patent is extended or adjusted under 35 U.S.C. 154(b) by 211 days.

(21) Appl. No.: 13/146,927

(22) PCT Filed: Jan. 14, 2010

(86) PCT No.: PCT/FI2010/050013
§ 371 (c)(1),
(2), (4) Date: Sep. 27, 2011

(87) PCT Pub. No.: WO2010/086495
PCT Pub. Date: Aug. 5, 2010

(65) Prior Publication Data
US 2012/0021718 A1    Jan. 26, 2012

(30) Foreign Application Priority Data
Jan. 30, 2009    (FI) ................................. 20095087

(51) Int. Cl.
*H04L 12/14* (2006.01)
*H04M 15/00* (2006.01)
*H04W 24/08* (2009.01)

(52) U.S. Cl.
CPC ............ *H04L 12/14* (2013.01); *H04L 12/1403* (2013.01); *H04L 12/1485* (2013.01);
(Continued)

(58) Field of Classification Search
CPC . H04L 12/14; H04L 12/1485; H04L 12/1403; H04M 15/58; H04M 15/8214; H04M 15/73; H04M 15/82; H04M 2215/78; H04M 2215/0188; H04M 2215/7072; H04M 2215/782; H04W 24/08

USPC ................................................. 455/405–408
See application file for complete search history.

(56) References Cited

U.S. PATENT DOCUMENTS 7,945,255 B2 * 5/2011 Harris et al. .................. 455/418
8,374,576 B2 * 2/2013 Bedingfield et al. .......... 455/405
(Continued)

FOREIGN PATENT DOCUMENTS

JP    2004364209 A    12/2004
JP    2006507566 A    3/2006
(Continued)

OTHER PUBLICATIONS

International Search Report dated May 10, 2010; corresponding to the PCT application.
(Continued)

*Primary Examiner* — Brandon Miller
(74) *Attorney, Agent, or Firm* — Young & Thompson (57) ABSTRACT

An arrangement for gathering data from a communication network (101) includes a server device (102) connected to the communication network. The arrangement includes in user terminal devices (107,108) an interface application arranged to transmit to the server device first data related to telecommunication services provided by the communication network. The server device is arranged to produce second data, e.g. fees payable due to the usage of the telecommunication services, at least partly on the basis of the first data and to make the second data accessible to users (109,110) of the user terminal devices. The user terminal devices are utilised in gathering data from the communication network and thus the data is automatically gathered from those locations of the communication network in which the network and the telecommunication services are being used and thus no separate devices for gathering data are needed.

17 Claims, 6 Drawing Sheets

(52) U.S. Cl.
CPC .............. *H04M15/58* (2013.01); *H04M 15/73* (2013.01); *H04M 15/82* (2013.01); *H04M 15/8214* (2013.01); *H04M 2215/0188* (2013.01); *H04M 2215/7072* (2013.01); *H04M 2215/78* (2013.01); *H04M 2215/782* (2013.01); *H04W 24/08* (2013.01)

(56) References Cited

U.S. PATENT DOCUMENTS

| | | | |
|---|---|---|---|
| 2003/0134631 A1 | 7/2003 | Snyder et al. | |
| 2004/0044623 A1* | 3/2004 | Wake et al. | 705/40 |
| 2006/0041657 A1 | 2/2006 | Wen et al. | |
| 2006/0205400 A1 | 9/2006 | Kiyomoto | |
| 2006/0270400 A1 | 11/2006 | Dasilva et al. | |
| 2007/0213054 A1* | 9/2007 | Han | 455/435.2 |
| 2008/0293429 A1 | 11/2008 | Harris et al. | |
| 2009/0197600 A1 | 8/2009 | Lee et al. | |
| 2009/0207749 A1 | 8/2009 | Roskowski | |

FOREIGN PATENT DOCUMENTS

| | | |
|---|---|---|
| JP | 2006254208 A | 9/2006 |
| JP | 2008288777 A | 11/2008 |
| WO | 2004004381 | 1/2004 |
| WO | 2004021133 A2 | 3/2004 |
| WO | 2006005947 | 1/2006 |
| WO | 2007113296 | 10/2007 |

OTHER PUBLICATIONS

Finnish Office Action dated May 26, 2010; corresponding to the Finnish priority application.
Translation of Chinese Office Action, dated Jan. 6, 2014, from corresponding CN application.

* cited by examiner

METHOD AND ARRANGEMENT FOR GATHERING DATA FROM A COMMUNICATION NETWORK

FIELD OF THE INVENTION

The invention relates generally to a method and arrangement for gathering data from a communication network. Furthermore, the invention relates to a user terminal device, a server device, a computer program suitable for a user terminal device, and a computer program suitable for a server device.

BACKGROUND

In the telecommunication industry, it is commonplace to have a need to gather many types of data from a communication network that may comprise e.g. a mobile communication network and/or a landline communication network. For example, it may be necessary for an operator of the communication network to gather data related to usage of telecommunication services provided by the communication network in order to be able to charge the subscribers for the usage of the telecommunication services. The data related to the usage of the telecommunication services is typically gathered from operator controlled network elements such as, for example, telephone exchanges, network management units, base stations, base station controllers, routers, and/or other network elements that are controlled and maintained by the operator. The fees to be paid by an individual subscriber, i.e. a user of a user terminal device, are determined on the basis of pricing basis applicable to the telecommunication services and data gathered from the above-mentioned operator controlled network elements. Hence, an individual subscriber has a very little chance to check whether he is correctly invoiced.

For another example, there may be a need to monitor the quality of service and performance of the communication network. The operator may gather data related to the usage and availability of the telecommunication services from the operator controlled network elements. The gathered data may comprise information about for example availability of the telecommunication services under consideration and service breaks occurred in conjunction with the said telecommunication services. Furthermore, the operator may use field measurements for monitoring signal levels and/or signal quality at different locations of the communication network. The field measurements are typically carried out by personnel who move on the field and/or in buildings with portable or vehicle-mounted monitoring devices.

Publication US 2006270400 discloses a test system for providing a view of performance of, and problems arising in a wireless communication system. The test system comprises a portable or vehicle-mounted wireless monitoring device for gathering information regarding radio frequency (RF) aspects of the wireless communication system. The test system comprises also a network data monitoring device for gathering information regarding network aspects of the wireless communication system, and a system performance analysis tool coupled to the wireless monitoring device and coupled to the network data monitoring device and arranged to correlate information gathered by the wireless monitoring device and by the network monitoring device. The quality of the monitoring activity described above depends on how frequently and how geographically extensively the wireless monitoring device is used in the wireless communication system. Also the costs due to the monitoring activity depend on the same factors. Hence, due the usage of the wireless monitoring device, there is a trade off between the quality and costs of the monitoring activity.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description.

In accordance with a first aspect of the invention there is provided a new arrangement for gathering data from a communication network. The arrangement according to the invention comprises a server device connected to the communication network and, in at least one user terminal device connected to the communication network, an interface application arranged to:

gather, from functional elements of the user terminal device, first data related to telecommunication services provided by the communication network, and control the user terminal device to transmit the first data to the server device via the communication network, wherein the server device is arranged to produce second data at least partly on the basis of the first data and to make the second data accessible to a user of the at least one user terminal device.

In the above-described arrangement, the user terminal devices are used for gathering data from the communication network and thus the data is automatically gathered from those locations of the communication network in which the network and the telecommunication services are being used and thus no separate monitoring devices for gathering data are needed.

In an arrangement according to an exemplifying embodiment of the invention, the first data comprises event information related to usage of the telecommunication services, and the server device is arranged to calculate fees payable due to the usage of the telecommunication services on the basis of the event information and pricing basis applicable to the telecommunication services. The calculated fees, which are based on the event information gathered from the user terminal device, can be compared with invoicing data produced in the traditional manner by the operator in order to check whether the user of the user terminal device is correctly invoiced.

In an arrangement according to another exemplifying embodiment of the invention, the first data comprises information related to quality of operation of the communication network, and the server device is arranged to form service quality indicators for the telecommunication services at least partly on the basis of the first data. The information related to the quality of the operation of the communication network may indicate, for example, signal quality/strength prevailing at the user terminal device, availability of the telecommunication services under consideration, and service breaks occurred in conjunction with the said telecommunication services. The first data may further comprise technical data such as a network technology being used, a physical communication network being used, an identifier of a service provider, and a geographic location of a mobile communication device.

In an arrangement according to an exemplifying embodiment of the invention, the processing system of the server device is arranged to form statistical service quality indicators for the telecommunication services on the basis of data received from a plurality user terminal devices. As the user terminal devices are utilised in gathering the data related to the quality of the operation of the communication network, there is no need to use dedicated monitoring devices as in conjunction with the technical solution according to the prior art described earlier in this document.

An arrangement according to an exemplifying embodiment of the invention is configured to provide the functionality of two or more of the above-presented arrangements according to the exemplifying embodiments of the invention.

In accordance with a second aspect of the invention there is provided a new user terminal device. The user terminal device according to the invention comprises:

functional elements for enabling a user of the user terminal device to use telecommunication services provided by a communication network, and an interface application arranged to gather, from the functional elements, data related to the telecommunication services and to control the functional elements to transmit the gathered data to a server device via a communication network.

In accordance with a third aspect of the invention there is provided a new server device for gathering data from a communication network. The server device according to the invention comprises:

first interface circuitries arranged to receive first data from at least one user terminal device via the communication network, the first data being related to telecommunication services provided by the communication network, a processing system arranged to produce second data at least partly on the basis of the first data, and second interface circuitries arranged to make the second data accessible to a user of the at least one user terminal device.

In accordance with a fourth aspect of the invention there is provided a new computer program for a user terminal device that comprises functional elements for enabling a user of the user terminal device to use telecommunication services provided by a communication network. The computer program according to the invention comprises computer executable instructions for controlling a programmable processor to:

gather, from the functional elements of the user terminal device, data related to the telecommunication services, and control the functional elements of the user terminal device to transmit the gathered data to a server device via the communication network.

In accordance with a fifth aspect of the invention there is provided a new computer program for a server device connected to a communication network. The computer program according to the invention comprises computer executable instructions for making a programmable processor to:

produce second data at least partly on the basis of first data received from at least one user terminal device via the communication network, the first data being related to telecommunication services provided by the communication network, and control interface circuitries of the server device to make the second data accessible to a user of the at least one user terminal device.

A computer program product according to the invention comprises a computer readable medium, e.g. a compact disc (CD), encoded with a computer program according to the invention.

In accordance with a sixth aspect of the invention there is provided a new method for gathering data from a communication network. The method according to the invention comprises:

gathering first data from functional elements of at least one user terminal device connected to the communication network, the first data being related to telecommunication services provided by the communication network and the functional elements enabling a user of the user terminal device to use the telecommunication services, producing second data at least partly on the basis of the first data, and making the second data accessible to a user of the at least one user terminal device.

A number of further exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
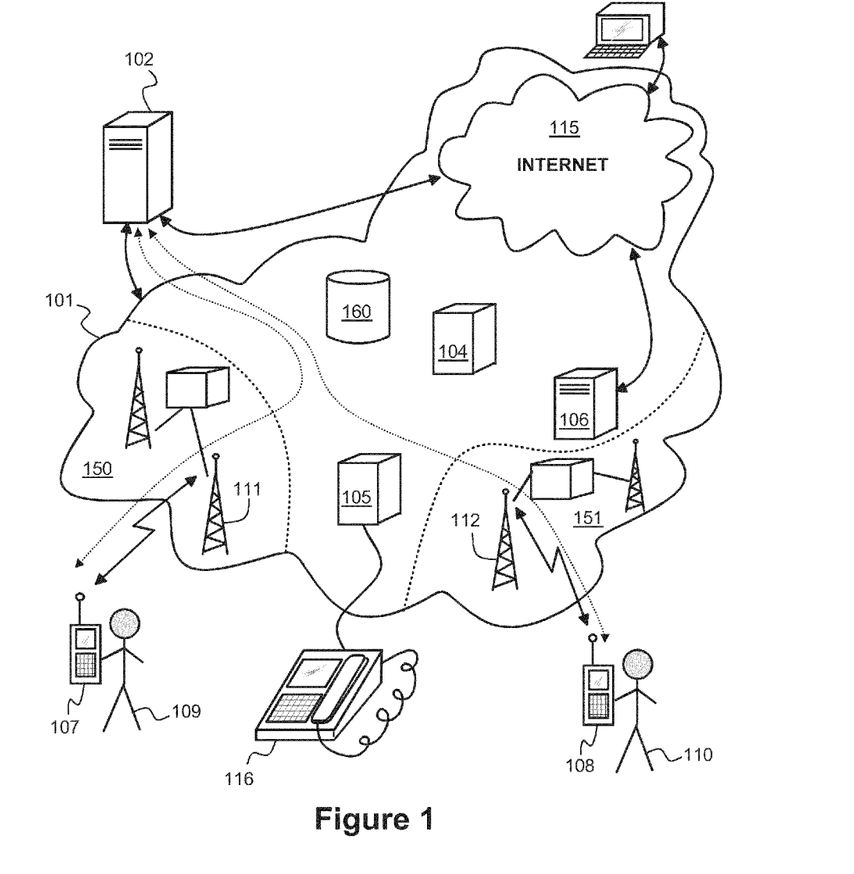
FIG. 1 shows a schematic illustration of an arrangement according to an embodiment of the invention for gathering data from a communication network.

FIG. 1 shows a schematic illustration of an arrangement according to an embodiment of the invention for gathering data from a communication network 101. The communication network comprises operator controlled network elements 103, 104, 105, and 106 and data transfer links arranged to interconnect these network elements. The operator controlled network elements may be for example telephone exchanges, network management units, base stations, base station controllers, routers, and/or other network elements that are controlled and maintained by an operator. User terminal devices 107 and 108 comprise functional elements arranged to enable users 109 and 110 of the user terminal devices to utilise telecommunication services provided with the aid of the communication network. The telecommunication services may include for example delivery of speech, data transfer, short message service (SMS), multimedia message service (MMS), Internet access, electronic mail service, and/or other telecommunication services realisable with the aid of the communication network. The functional elements of the user terminal devices 107 and 108 can comprise, for example, transceiver elements, user interface elements, processor units, power supply elements, and memory elements. The memory element are typically arranged to store e.g. event log files and network status information. The user terminal devices 107 and 108 shown in FIG. 1 are mobile terminal devices connected to the communication network 101 via radio links established between the user terminal devices and base stations 111 and 112. However, it is also possible to have user terminal devices such as for example a landline telephone 116 that are connected to the communication network 101 with metallic or fiber landlines.

The arrangement for gathering data from the communication network 101 comprises a server device 102 that is connected to the communication network. The arrangement further comprises in each of the user terminal devices 107 and 108 an interface application that is arranged to gather, from the functional elements of the user terminal device in question, first data related to the telecommunication services provided by the communication network. The first data may comprise, for example, event data related to usage of the telecommunication services, signal strength/quality prevailing at the user terminal device in question, network technology being used in conjunction with a certain telecommunication service, physical communication network being used in conjunction with a certain telecommunication service, identification data of a service provider (SP), a geographic location of the user terminal device in question, availabilities of the telecommunication services, service breaks occurred in the telecommunication services, routing information, and/or other information that is stored in and/or is accessible to the user terminal device in question. The interface application of each user terminal device is further arranged to control the user terminal device to transmit the first data to the server device 102. The interface application may be arranged to activate the transmission of the first data automatically or as a response to a command or permission given by the user via a user interface of the user terminal device in question. The server device 102 is arranged to produce second data at least partly on the basis of the first data and to make the second data accessible to the user of the user terminal device in question. The server device 102 can be arranged to transmit the second data to the user terminal device via the communication network and/or to make the second data accessible via the Internet 115.

In an arrangement according to an embodiment of the invention, the server device 102 is arranged to gather data from one or more operator controlled network elements 103-106 and to produce the second data at least partly on the basis of the first data received from the one or more user terminal devices 107-108 and the data received from the one or more operator controlled network elements. The data received from the operator controlled network elements can comprise for example pricing basis, i.e. invoicing principles, determined by an operator, information about service providers (SP) operating in the communication network, information about subscribers, information about geographic locations of mobile terminal devices, and/or other information that is stored and maintained by an operator.

In an arrangement according to an embodiment of the invention, the first data transferred from at least one user terminal device 107 and/or 108 to the server device 102 comprises event information related to usage of the telecommunication services. The event information may indicate for example durations of usage sessions of the telecommunication services under considerations, start times and end times of the usage sessions, durations of possible service breaks, time moments of the possible service breaks, and/or other information related to the usage of the telecommunication services. The server device 102 is arranged to calculate fees payable due to the usage of the telecommunication services on the basis of the event information and pricing basis applicable to the telecommunication services under consideration. The server device can be arranged to retrieve the pricing basis from one or more of the operator controlled network elements 103-106. It is also possible that the pricing basis is given to the server device manually or using external means. The pricing basis represents charging principles according to which a subscriber, i.e. a user of a user terminal device, is charged for usage of different telecommunication services. A fee payable may be determined for example on the basis of a cumulative usage time of a telecommunication service under consideration, or on the basis of transferred amount of data, e.g. number of bytes, or there may be a flat fee per month, year or some other pre-determined time period for a telecommunication service under consideration, or the pricing basis can be a combination of two or more of the above-mentioned principles. The calculated fees, which are based on the event information gathered from the user terminal device 107 or 108, can be compared with invoicing data produced in the traditional manner by the operator in order to check whether the user 109 or 110 is correctly invoiced. The calculated fees and/or the result of the above-presented comparison can be transmitted from the server device 102 to the user terminal device 107 and/or 108 via the communication network 101 for example in an SMS-message (Short Message Service), in a multimedia message, or in another suitable data message. It is also possible that the calculated fees and/or the result of the above-presented comparison are made accessible via the Internet 115.

In an arrangement according to an embodiment of the invention, the server device 102 is arranged retrieve, on the basis of the event information related to the usage of the telecommunication services, a transmission network identifier from a number database 160 maintained in the communication network. The transmission network identifier can be transmitted from the server device 102 to the user terminal device 107 and/or 108 via the communication network 101 for example in an SMS-message (Short Message Service), in a multimedia message, or in another suitable data message. Hence, the user of the user terminal device knows which transmission network provides the telecommunication service being used by the user. The operation is illustrated with the following exemplifying case. The user 109 calls to the user 110. The user terminal device 107 is connected to a transmission network 150 that can be a cellular mobile network comprising bases stations, base station controllers, a mobile switching centre, and a home location register. The user terminal device 108 is connected to another transmission network 151 that can be a cellular mobile network comprising base stations, base station controllers, a mobile switching centre, and a home location register. The interface application of the user terminal device 107 transmits event information related to the call to the server device 102. The event information includes a destination telephone number i.e. the telephone number of the user terminal device 108. The server device 102 retrieves from the number data base 160 a transmission network identifier that indicates that the telephone number of the user terminal device 108 belongs to the transmission network 151. The server device transmits the said transmission network identifier to the terminal device 107. Hence, the user 109 knows that he is using the transmission network 151.

In an arrangement according to an embodiment of the invention, the server device 102 is arranged to calculate different alternatives for the fees payable due to the usage of the telecommunication services on the basis of the event information related to the usage of the telecommunication services and different alternative pricing basis applicable to the telecommunication services. The server device is arranged to make the calculated alternatives for the fees accessible at least to the user 109 or 110. Hence, the user 109 or 110 is enabled to compare the calculated alternatives for the fees and to select the most advantageous pricing basis alternative.

In an arrangement according to an embodiment of the invention, the server device 102 is arranged to calculate alternatives for the fees payable due to the usage of the telecommunication services on the basis of the event information related to the usage of the telecommunication services and pricing basis applicable to different alternative telecommunication services that are available. For example, if the conventional speech delivery service has been used, the server device can be arranged to calculate the fees payable due to the usage of the conventional speech delivery service and also fees which would be payable due to the corresponding usage of an alternative speech delivery service, e.g. the VoIP-service (Voice Over Internet Protocol), on the basis of the event information related to the usage of the conventional speech delivery service, e.g. duration of a call, and the pricing basis of the VoIP-service. The server device is arranged to make the calculated fees and alternative fees accessible to at least the user 109 or 110. Hence, the user 109 or 110 is enabled to compare the fees payable with the alternative fees and to select for the future use the most advantageous telecommunication services.

In an arrangement according to an embodiment of the invention, the server device 102 is arranged to calculate alternatives for the fees payable due to the usage of the telecommunication services on the basis of the event information related to the usage of the telecommunication services, the pricing basis applicable to different alternative telecommunication services, and geographical location of the user terminal device in question. The geographical location is used in cases in which the fees payable due to usage of the telecommunication services under consideration depends on the geographical location, e.g. in roaming situations.

In an arrangement according to an embodiment of the invention, the server device 102 is arranged to calculate the fees payable and the alternative fees that would be payable due to corresponding usage of the alternative telecommunication services, and to make the calculated fees and alternative fees accessible to the user terminal device 107 and/or 108. The interface application of the user terminal device 107, 108 and/or 116 is arranged to use history information related to the fees and the alternative fees for proposing a telecommunication service that is advantageous in light of the said history information as a response to a situation in which the user of the user terminal device in question takes an action to use another, but corresponding telecommunication service than the one that is advantageous in light of the said history information.

The usage of the telecommunication services covers not only such usage that is initiated by a user of a user terminal device but also such usage in which the user terminal device automatically receives, generates and/or forwards telecommunication traffic without actions taken by the user. In the case of automatic telecommunication traffic reception, generation and/or forwarding, the server device is advantageously arranged to calculate the fees payable and also the alternative fees that would be payable with alternative parameter settings other than the prevailing parameter settings of the user terminal device, the parameter settings controlling among others the automatic telecommunication traffic reception, generation and/or forwarding. In this case, the first data transferred from a user terminal device to the server device comprises also information about the parameter settings of the user terminal device. The server device is advantageously arranged to make the calculated fees and alternative fees accessible to the user terminal device. The interface application of the user terminal device is advantageously arranged to use the information related to the fees and the alternative fees for warning the user about a risk of high fees and/or to propose changes to the parameter settings of the user terminal device.

In an arrangement according to an embodiment of the invention, the first transferred from at least one user terminal device 107 and/or 108 to the server device 102 comprises information related to quality of operation of the communication network 101. The first data may comprise, for example, signal quality/strength prevailing at the user terminal device in question, data transfer speed (bit/sec) prevailing at the user terminal device in question, availability of the telecommunication services under consideration, and service breaks occurred in conjunction with the said telecommunication services. The first data may further comprise technical data such as a network technology being used e.g. GSM, EDGE, WCDMA, a physical communication network being used, an identifier of a service provider, and a geographic location of a mobile communication device. The server device is arranged to form service quality indicators for the telecommunication services at least partly on the basis of the first data. The service quality indicators may indicate for example for different network technologies, e.g. GSM, EDGE, WCDMA, and/or for different service providers a percentage of time when a signal level has been sufficient for a reliable data transmission, service break rates for the different network technologies and/or for the different service provides, data transfer speeds for the different network technologies and/or for the different service provides, and/or other indicators which illustrate the quality of the telecommunication services. The service quality indicators can be transmitted from the server device 102 to the user terminal device 107 and/or 108 via the communication network as for example in an SMS-message (Short Message Service), in a multimedia message, or in another suitable data message. It is also possible that the service quality indicators are made accessible via the Internet 115. As the user terminal devices 107 and 108 are used for gathering data from the communication network 101 the data is automatically gathered from those locations of the communication network in which the network and the telecommunication services are being used. Furthermore, no separate monitoring devices for gathering the data are needed.

In an arrangement according to an embodiment of the invention, the interface application of the user terminal device 107, 116, and/or 108 is arranged to control the functional elements of the user terminal device to generate automatically, without a need for actions taken by a user, telecommunication traffic that can be used e.g. for measuring the quality of the telecommunication services provided with the aid of the communication network 101.

In an arrangement according to an embodiment of the invention, the interface application of the user terminal device 107, 116, and/or 108 is arranged to force the functional elements of the user terminal device in question to switch off from communicating with a transmission network that is the default transmission network of the user terminal device so as to force the user terminal device to communicate with neighbouring transmission networks in order to e.g. provide measurements related to the quality of one or more neighbouring transmission networks. The communication network 101 may include several parallel and/or mutually overlapping transmission networks. The default transmission network may be for example the one that is defined in a SIM-card of a mobile phone (Subscriber Identity Module).

In an arrangement according to an embodiment of the invention, the server device 102 is arranged to form price vs. quality indicators on the basis of the service quality indicators and the calculated fees, which are based on the pricing basis and the event information gathered from the user terminal device(s) 107 and/or 108. The price vs. quality indicators can be transferred to the user terminal devices via the communication network 101 and/or they can be made accessible via the Internet.

In an arrangement according to an embodiment of the invention, the server device 102 is arranged to form statistical service quality indicators for the telecommunication services on the basis of data received from a plurality of user terminal devices during a pre-determined time interval. The received data is related to quality of operation of the communication network 101 observed with different user terminal devices at different moments of time. The statistical service quality indicators can be transferred to the user terminal devices via the communication network 101 and/or the statistical service quality indicators can be made accessible via the Internet.

Figure 2:
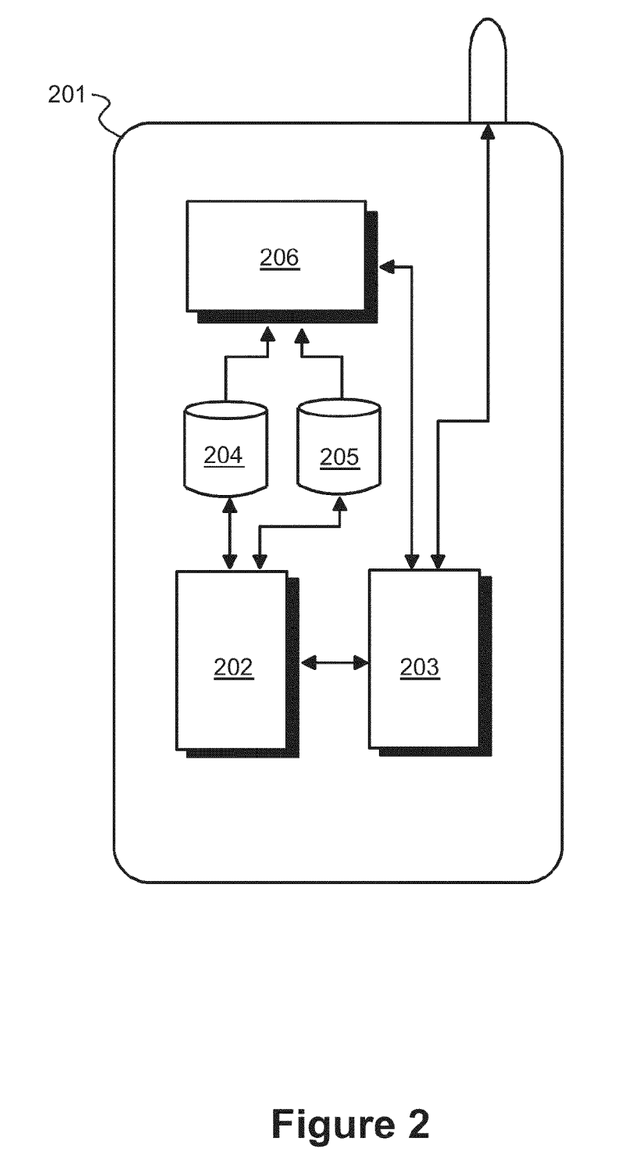
FIG. 2 shows a schematic illustration of a user terminal device according to an embodiment of the invention.

FIG. 2 shows a schematic illustration of a user terminal device 201 according to an embodiment of the invention. The user terminal device can be a mobile phone, a palmtop computer, a personal digital assistant, or a combination of two or more of them. The user terminal device comprises functional elements 202, 203, 204, and 205 for enabling a user of the user terminal device to use telecommunication services provided by a communication network. The functional elements 204 and 205 are preferably memory blocks arranged to store event log files and network status information. The user terminal device further comprises an interface application 206 arranged to:
 gather, from the functional elements, data related to the telecommunication services, and
 control the functional elements to transmit the gathered data to a server device via the communication network.

In a user terminal device according to an embodiment of the invention, the gathered data comprises event information related to usage of the telecommunication services. The event information and pricing basis applicable to the telecommunication services makes possible to determine fees payable due to the usage of the telecommunication services. It should be noted that the usage of the telecommunication services covers not only such usage that is initiated by the user of the user terminal device but also such usage in which the user terminal device automatically receives, generates and/or forwards telecommunication traffic without actions taken by the user.

In a user terminal device according to an embodiment of the invention, the gathered data comprises information related to quality of operation of the communication network. The gathered data may indicate, for example, signal quality/strength prevailing at the user terminal device, availability of the telecommunication services under consideration, and service breaks occurred in conjunction with the said telecommunication services. The gathered data may further comprise technical data such as a network technology being used, a physical communication network being used, an identifier of a service provider, and a geographic location of the user terminal device.

A user terminal device according to an embodiment of the invention is arranged to receive from the server device calculated fees payable due to the usage of the telecommunication services and alternative fees that would be payable due to usage of corresponding alternative telecommunication services. A user interface of the user terminal device is arranged to make the calculated fees and alternative fees accessible to a user of the user terminal device. Hence, the user is enabled to compare the fees payable with the alternative fees and to select for the future use the most advantageous telecommunication services.

In a user terminal device according to an embodiment of the invention, the interface application 206 is arranged to use history information related to the fees and the alternative fees for proposing a telecommunication service that is advantageous in light of the said history information as a response to a situation in which the user of the user terminal device takes an action to use another, but corresponding telecommunication service than the one that is advantageous in light of the said history information.

In a user terminal device according to an embodiment of the invention, the interface application 206 is arranged to use the information related to the fees and the alternative fees for warning the user about a risk of high fees and/or to propose changes to the parameter settings of the user terminal device.

In a user terminal device according to an embodiment of the invention, the interface application 206 is arranged to control the functional elements 202-205 of the user terminal device to generate automatically, without a need for actions taken by the user, telecommunication traffic that can be used for e.g. measuring the quality of the telecommunication services provided with the aid of the communication network.

In a user terminal device according to an embodiment of the invention, the interface application 206 is arranged to force the functional elements 202-205 of the user terminal device to switch off from communicating with a transmission network that is the default transmission network of the user terminal device so as to force the user terminal device to communicate with neighbouring transmission networks in order e.g. to provide measurements related to the quality of one or more neighbouring transmission networks.

Figure 3:
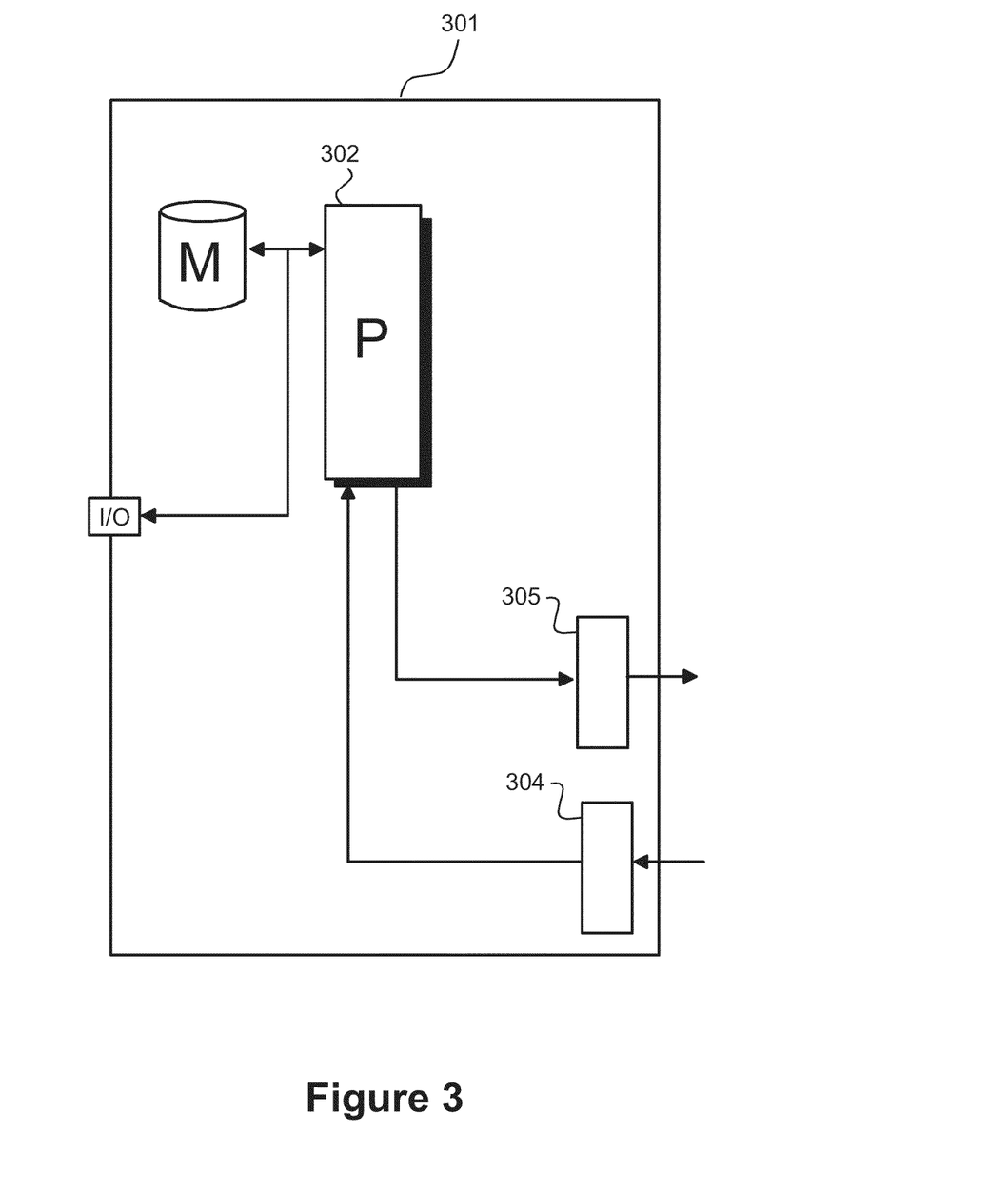
FIG. 3 shows a schematic illustration of a server device according to an embodiment of the invention for gathering data from a communication network.

FIG. 3 shows a schematic illustration of a server device 301 according to an embodiment of the invention for gathering data from a communication network. The server device comprises first interface circuitries 304 arranged to receive first data from at least one user terminal device via the communication network. The first data is related to telecommunication services provided by the communication network. The server device further comprises a processing system 302 arranged to produce second data at least partly on the basis of the first data, and second interface circuitries 305 arranged to make the second data accessible to a user of the at least one user terminal device.

A server device according an embodiment of the invention is arranged to gather data from one or more operator controlled network elements and to produce the second data at least partly on the basis of the first data received from the one or more user terminal devices and the data received from the one or more operator controlled network elements. The data received from the operator controlled network elements can comprise for example pricing basis, i.e. invoicing principles, determined by an operator, information about service providers (SP) operating in the communication network, information about subscribers, information about geographic locations of mobile terminal devices, and/or other information that is stored and maintained by an operator.

In a server device according an embodiment of the invention, the first data comprises event information related to usage of the telecommunication services and the processing system 302 is arranged to calculate fees payable due to the usage of the telecommunication services on the basis of the first data and pricing basis applicable to the telecommunication services. In this case the calculated fees represent at least a part of the second data that is made accessible to the user of the at least one user terminal device.

In a server device according an embodiment of the invention, the processing system 302 is arranged to calculate different alternatives for the fees payable due to the usage of the telecommunication services on the basis of the event information and different alternative pricing basis applicable to the telecommunication services. Hence, the user of the user terminal device is enabled to compare the calculated alternatives for the fees and select the most advantageous pricing basis alternative.

In a server device according an embodiment of the invention, the processing system 302 is arranged to calculate alternatives for the fees payable due to the usage of the telecommunication services on the basis of the event information related to the usage of the telecommunication services and pricing basis applicable to different alternative telecommunication services that are available. In this case the calculated fees and alternative fees represent at least a part of the second data that is made accessible to the user of the at least one user terminal device. Hence, the user of the user terminal device is enabled to compare the fees payable with the alternative fees and to select for the future use the most advantageous telecommunication services.

In a server device according an embodiment of the invention, the processing system 302 is arranged to calculate alternatives for the fees payable due to the usage of the telecommunication services on the basis of the event information related to the usage of the telecommunication services, the pricing basis applicable to different alternative telecommunication services, and geographical location of the user terminal device in question. The geographical location is used in cases in which the fees payable due to usage of the telecommunication services under consideration depends on the geographical location, e.g. in roaming situations.

In a server device according an embodiment of the invention, first data comprises information related to prevailing parameter settings of the user terminal device, the parameter settings controlling in the user terminal device e.g. automatic telecommunication traffic reception, generation and/or forwarding. The processing system 302 is arranged to calculate the fees payable and also alternative fees that would be payable with alternative parameter settings of the user terminal device. In this case the calculated fees and alternative fees represent at least a part of the second data that is made accessible to the user of the at least one user terminal device.

In a server device according an embodiment of the invention, the first data comprises information related to quality of operation of the communication network, and the processing system 302 is arranged to form service quality indicators for the telecommunication services at least partly on the basis of the first data. In this case, the service quality indicators represent at least a part of the second data that is made accessible to the user of the at least one user terminal device.

In a server device according an embodiment of the invention, the first data comprises both event information related to usage of the telecommunication services and information related to quality of operation of the communication network. The processing system 302 is arranged form price vs. quality indicators for the telecommunication services on the basis of the first data and the pricing basis applicable to the telecommunication services. In this case, the price vs. quality indicators represent at least a part of the second data that is made accessible to the user of the at least one user terminal device.

In a server device according an embodiment of the invention, the processing system 302 is arranged to form statistical service quality indicators for the telecommunication services on the basis of data received from a plurality of user terminal devices connected to the communication network. The received data is related to quality of operation of the communication network observed with different user terminal devices at different moments of time. In this case, the statistical service quality indicators represent at least a part of the second data that is made accessible to the user of the at least one user terminal device.

A server device according an embodiment of the invention is arranged retrieve, on the basis of the event information related to the usage of the telecommunication services, a transmission network identifier from a number database maintained in the communication network. In this case the transmission network identifier represent at least a part of the second data that is made accessible to the user of the at least one user terminal device. Hence, the user of the user terminal device is enabled to know which transmission network provides the telecommunication service being used by the user.

In a server device according an embodiment of the invention, the second interface circuitries 305 are arranged to transmit the second data to the at least one user terminal device via the communication network.

In a server device according an embodiment of the invention, the second interface circuitries 305 are arranged to make the second data accessible via the Internet.

Figure 4:
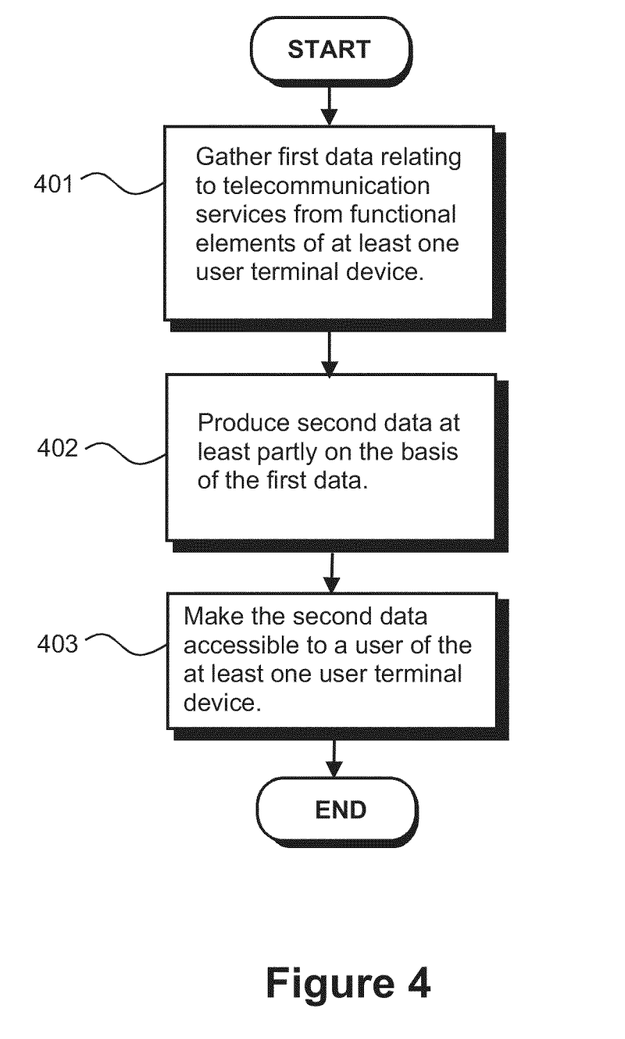
FIG. 4 shows a flow chart of a method according to an embodiment of the invention for gathering data from a communication network.

FIG. 4 shows a flow chart of a method according to an embodiment of the invention for gathering data from a communication network. A phase 401 comprises gathering first data from functional elements of at least one user terminal device connected to the communication network. The first data is related to telecommunication services provided by the communication network and the functional elements enable a user of the user terminal device to use the telecommunication services. A phase 402 comprises producing second data at least partly on the basis of the first data, and a phase 403 comprises making the second data accessible to a user of the at least one user terminal device.

In a method according to an embodiment of the invention, the second data is made accessible to the user of the at least one user terminal device by transmitting the second data to the at least one user terminal device via the communication network.

In a method according to an embodiment of the invention, the second data is made accessible to the user of the at least one user terminal device by making the second data accessible via the Internet.

In a method according to an embodiment of the invention, the communication network comprises at least one of the following: a mobile communication network, a landline communication network.

Figure 5:
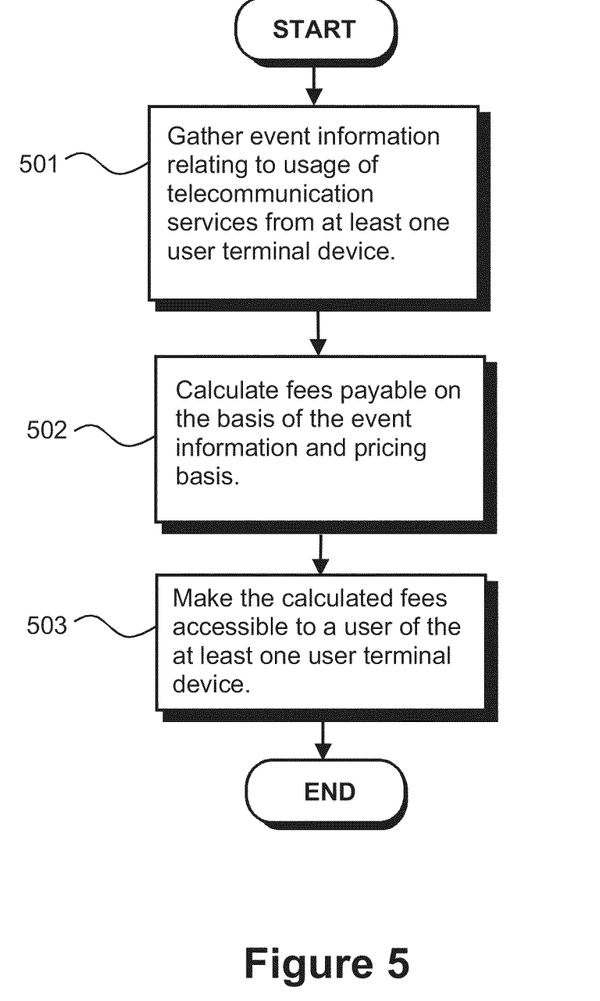
FIG. 5 shows a flow chart of a method according to an embodiment of the invention for gathering data from a communication network.

In a method according to an embodiment of the invention, the user terminal device is a mobile communication device and the communication network is a mobile communication network FIG. 5 shows a flow chart of a method according to an embodiment of the invention for gathering data from a communication network. A phase 501 comprises gathering event information related to usage of the telecommunication services from functional elements of at least one user terminal device connected to the communication network. A phase 502 comprises calculating fees payable due to the usage of the telecommunication services on the basis of the event information and pricing basis applicable to the telecommunication services, and a phase 503 comprises making the calculated fees accessible to a user of the at least one user terminal device.

A method according to an embodiment of the invention comprises calculating different alternatives for the fees payable due to the usage of the telecommunication services on the basis of the event information and different alternative pricing basis applicable to the telecommunication services. Hence, the user of the user terminal device is enabled to compare the calculated alternatives for the fees and select the most advantageous pricing basis alternative.

A method according to an embodiment of the invention comprises calculating alternatives for the fees payable due to the usage of the telecommunication services on the basis of the event information related to the usage of the telecommunication services and pricing basis applicable to different alternative telecommunication services that are available. Hence, the user of the user terminal device is enabled to compare the fees payable with the alternative fees, and to select for the future use the most advantageous telecommunication services.

A method according to an embodiment of the invention comprises calculating alternatives for the fees payable due to the usage of the telecommunication services on the basis of the event information related to the usage of the telecommunication services, the pricing basis applicable to different alternative telecommunication services, and geographical location of the user terminal device. The geographical location is used in cases in which the fees payable due to usage of the telecommunication services under consideration depends on the geographical location, e.g. in roaming situations.

A method according to an embodiment of the invention comprises using history information related to the fees and the alternative fees for proposing a telecommunication service that is advantageous in light of the said history information as a response to a situation in which the user of the user terminal device takes an action to use another, but corresponding telecommunication service than the one that is advantageous in light of the said history information.

The usage of the telecommunication services covers not only such usage that is initiated by a user of a user terminal device but also such usage in which the user terminal device automatically receives, generates and/or forwards telecommunication traffic without actions taken by the user.

A method according to an embodiment of the invention comprises calculating the fees payable and also the alternative fees that would be payable with alternative parameter settings other than the prevailing parameter settings of the user terminal device, the parameter settings controlling among others the automatic telecommunication traffic reception, generation and/or forwarding taking place in the user terminal device. The method according to this embodiment of the invention may further comprise using the information related to the fees and the alternative fees for warning the user about a risk of high fees and/or to propose changes to the parameter settings of the user terminal device.

In a method according to an embodiment of the invention, the calculated fees and possible alternative fees are made accessible to the user of the at least one user terminal device by transmitting the calculated fees to the at least one user terminal device via the communication network.

In a method according to an embodiment of the invention, the calculated fees and possible alternative fees are made accessible to the user of the at least one user terminal device by making the calculated fees accessible via the Internet.

Figure 6:
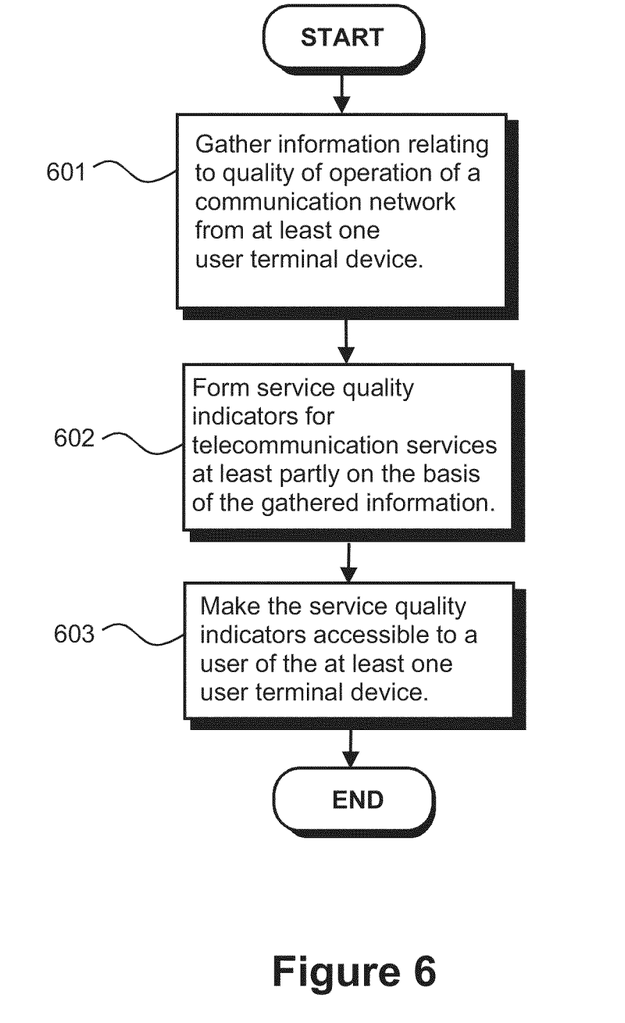
FIG. 6 shows a flow chart of a method according to an embodiment of the invention for gathering data from a communication network.

FIG. 6 shows a flow chart of a method according to an embodiment of the invention for gathering data from a communication network. A phase 601 comprises gathering information related to quality of operation of the communication network from functional elements of at least one user terminal device connected to the communication network. A phase 602 comprises forming service quality indicators for telecommunication services under consideration at least partly on the basis of the gathered data, and a phase 603 comprises making the service quality indicators accessible to a user of the at least one user terminal device.

In a method according an embodiment of the invention, the data gathered from the at least one user terminal device comprises both event information related to the usage of the telecommunication services and information related to the quality of the operation of the communication network. The method according to this embodiment of the invention comprises forming price vs. quality indicators for the telecommunication services on the basis of the gathered data and the pricing basis applicable to the telecommunication services. The method according to this embodiment of the invention further comprises making the price vs. quality indicators accessible to the user of the at least one user terminal device.

A method according to an embodiment of the invention comprises forming statistical service quality indicators for the telecommunication services on the basis of data gathered from functional elements of a plurality of user terminal devices connected to the communication network. The gathered data is related to the quality of the operation of the communication network observed with different user terminal devices at different moments of time. The method according to this embodiment of the invention further comprises making the statistical service quality indicators accessible to users of the plurality of user terminal devices.

In a method according to an embodiment of the invention, the functional elements of the user terminal device are controlled to generate automatically, without a need for actions taken by a user, telecommunication traffic that can be used e.g. for measuring the quality of the telecommunication services provided with the aid of the communication network.

In a method according to an embodiment of the invention, the functional elements of the user terminal are forced to switch off from communicating with a transmission network that is the default transmission network of the user terminal device so as to force the user terminal device to communicate with neighbouring transmission networks in order to e.g. provide measurements related to the quality of one or more neighbouring transmission networks. The communication network may include several parallel and/or mutually overlapping transmission networks. The default transmission network may be for example the one that is defined in a SIM-card of a mobile phone (Subscriber Identity Module).

A computer program according to an embodiment of the invention for a user terminal device comprises computer executable instructions for controlling a programmable processor of the user terminal device to:

gather, from functional elements of the user terminal device, data related to telecommunication services available to a user of the user terminal device, and control the functional elements of the user terminal device to transmit the gathered data to a server device via the communication network.

A computer program according to an embodiment of the invention for a server device connected to a communication network comprises computer executable instructions for controlling a programmable processor of the server device to:

produce second data at least partly on the basis of first data received from at least one user terminal device via the communication network, the first data being related to telecommunication services provided by the communication network, and control an interface circuitry of the server device to make the second data accessible to a user of the at least one user terminal device.

The computer executable instructions can be e.g. subroutines and/or functions.

A computer program product according to an embodiment of the invention is stored in a computer readable medium. The computer readable medium can be e.g. a CD-ROM (Compact Disc Read Only Memory) or a RAM-device (Random Access Memory).

A computer program product according to an embodiment of the invention is carried in a signal that is receivable from a communication network.

The specific examples provided in the description given above should not be construed as limiting. Therefore, the invention is not limited merely to the embodiments described above, many variants being possible.

What is claimed is:

1. An arrangement for gathering data from a communication network, comprising:
   a server device connected to the communication network; and
   in each of a plurality of user terminal devices connected to the communication network, an interface application configured to:
      gather, from functional elements of the user terminal device comprising the interface application under consideration, first data related to any of quality or quantity of telecommunication services provided by the communication network, and
      control the user terminal device comprising the interface application under consideration to transmit the first data to the server device via the communication network,
   wherein the server device is configured to:
      produce a second data based on the first data gathered from each of the plurality of user terminal devices, at least a part of the second data being formed of indicators of either of service quality or quantity, and
      transmit, via the communication network, the second data to at least one terminal device of the plurality of user terminal devices so as to make the second data accessible to a user of the at least one user terminal device.

2. The arrangement according to claim 1, wherein the server device is arranged to form the service quality indicators for the telecommunication services at least partly on the basis of the first data.

3. The arrangement according to claim 2, wherein the server device is arranged to form statistical service quality indicators for the telecommunication services on the basis of the first data and corresponding data received from other user terminal devices connected to the communication network, the statistical service quality indicators forming at least a part of the second data.

4. The arrangement according to claim 1, wherein the server device is arranged to calculate different alternatives for the fees payable due to the usage of the telecommunication services on the basis of the first data and different alternative pricing basis applicable to the telecommunication services, the calculated alternatives for the fees forming at least a part of the second data.

5. The arrangement according to claim 1, wherein the server device is arranged to make the second data accessible via the Internet (115).

6. arrangement according to claim 1, wherein the communication network comprises at least one of the following: a mobile communication network, a landline communication network.

7. A server device for gathering data from a communication network, comprising:
   first interface circuitries arranged to receive first data from a plurality of user terminal devices via the communication network, the first data being related to any of quality or quantity of telecommunication services provided by the communication network and gathered by the plurality of user terminal devices;
   a processing system arranged to produce a second data based on the first data received from each of the plurality of user terminal devices, at least a part of the second data being formed of indicators of either service quality or quantity; and
   second interface circuitries arranged to transmit the second data to at least one terminal device of the plurality of user terminal devices via the communication network so as to make the second data accessible to a user of the at least one user terminal device.

8. The server device according to claim 7, wherein the processing system is arranged to form the service indicators for the telecommunication services at least partly on the basis of the first data.

9. The server device according to claim 8, wherein the processing system is arranged to form statistical service quality indicators for the telecommunication services on the basis of the first data and corresponding data received from other user terminal devices connected to the communication network, the statistical service quality indicators forming at least a part of the second data.

10. The server device according to claim 7, wherein the second interface circuitries are arranged to make the second data accessible via the Internet.

11. A non-transitory computer readable medium having encoded thereon a computer program for a server device connected to a communication network, the computer program comprising computer executable instructions for controlling a programmable processor to:
   produce a second data based on first data received from each of a plurality of user terminal devices via the communication network, the first data being related to any of quality or quantity of telecommunication services provided by the communication network and gathered by the plurality of user terminal devices, at least a part of the second data being formed of indicators of either service quality or quantity, and
   control interface circuitries of the server device to transmit the second data to at least one user terminal device of the plurality of terminal devices via the communication network so as to make the second data accessible to a user of the at least one user terminal device.

12. A method for gathering data from a communication network, comprising:
- gathering first data from functional elements of a plurality of user terminal devices connected to the communication network, the first data being related to any of quality or quantity of telecommunication services provided by the communication network and the functional elements enabling a user of each of the user terminal devices to use the telecommunication services;
- producing a second data based on the first data of each of the plurality of user terminals, at least a part of the second data being formed of indicators of either service quality or quantity; and
- transmitting the second data to at least one terminal device of the plurality of user terminal devices via the communication network so as to make the second data accessible to a user of the at least one user terminal device.

13. The method according to claim 12, wherein the first data comprises event information related to usage of the telecommunication services, and the producing of the second data comprises calculating fees payable due to the usage of the telecommunication services on the basis of the first data and pricing basis applicable to the telecommunication services, the calculated fees forming at least a part of the second data.

14. The method according to claim 12, wherein the service indicators for the telecommunication services are produced at least partly on the basis of the first data.

15. The method according to claim 14, wherein the producing of the second data comprises forming statistical service quality indicators for the telecommunication services on the basis of the first data and corresponding data received from other user terminal devices connected to the communication network, the statistical service quality indicators forming at least a part of the second data.

16. The method according to claim 12, wherein the second data is made accessible to the user of the at least one user terminal device by making the second data accessible via the Internet.

17. The method according to claim 12, wherein the communication network comprises at least one of the following: a mobile communication network, and a landline communication network.

* * * * *